(12) United States Patent
Shannon et al.

(10) Patent No.: US 10,947,629 B2
(45) Date of Patent: Mar. 16, 2021

(54) GASKET, APPARATUS INCORPORATING SAME AND METHOD

(71) Applicant: INEOS TECHNOLOGIES SA, Vaud (CH)

(72) Inventors: Gary Martin Shannon, Cheshire (GB); Alan Robert Naylor, Cheshire (GB); Martin John Devine, Chorley (GB)

(73) Assignee: INEOS TECHNOLOGIES SA, Vaud (CH)

( * ) Notice: Subject to any disclaimer, the term of this patent is extended or adjusted under 35 U.S.C. 154(b) by 441 days.

(21) Appl. No.: 15/521,332

(22) PCT Filed: Oct. 29, 2015

(86) PCT No.: PCT/EP2015/075108
§ 371 (c)(1),
(2) Date: Apr. 24, 2017

(87) PCT Pub. No.: WO2016/074937
PCT Pub. Date: May 19, 2016

(65) Prior Publication Data
US 2017/0314149 A1    Nov. 2, 2017

(30) Foreign Application Priority Data

Nov. 10, 2014  (EP) .................................... 14192503

(51) Int. Cl.
*C25B 9/08*  (2006.01)
*C25B 13/02*  (2006.01)
(Continued)

(52) U.S. Cl.
CPC ................ *C25B 13/02* (2013.01); *C25B 1/46* (2013.01); *C25B 9/00* (2013.01); *C25B 9/206* (2013.01);
(Continued)

(58) Field of Classification Search
CPC .... C25B 9/08; C25B 1/10; C25B 9/00; C25B 1/06; C25B 13/00; C25B 9/16; C25B 9/206
(Continued)

(56) References Cited

U.S. PATENT DOCUMENTS 3,727,926 A    4/1973  Berry
4,026,565 A *  5/1977  Jelinek .................. F16J 15/121
                                                            277/639
(Continued)

FOREIGN PATENT DOCUMENTS

EP    1 367 301 A1    12/2003
EP    1 458 040 A2    9/2004
(Continued)

OTHER PUBLICATIONS

Frutschy et al; "Sodium Nickel Chloride Battery Design and Testing"; *ASME 2012 International Mechanical Engineering Congress and Exposition*, Jan. 1, 2012; pp. 429-438 (XP009178227).
(Continued)

*Primary Examiner* — Zulmariam Mendez
(74) *Attorney, Agent, or Firm* — Nixon & Vanderhye P.C.

(57) ABSTRACT

This invention relates to gaskets, apparatus incorporating said gaskets and to methods of using them. In particular, there is provided a gasket comprising a closed loop of resilient material, the loop having an inner periphery and an outer periphery, the gasket having a first thickness at a first position which is between 0% and 30% of the gasket width away from the outer periphery, a second thickness at a second position measured at a point at least 50% of the gasket width from the first position, and a third thickness at a third position intermediate the first and second positions and at least 10% of the gasket width from each, the first thickness being greater than the third thickness which is
(Continued)

Figure 1:
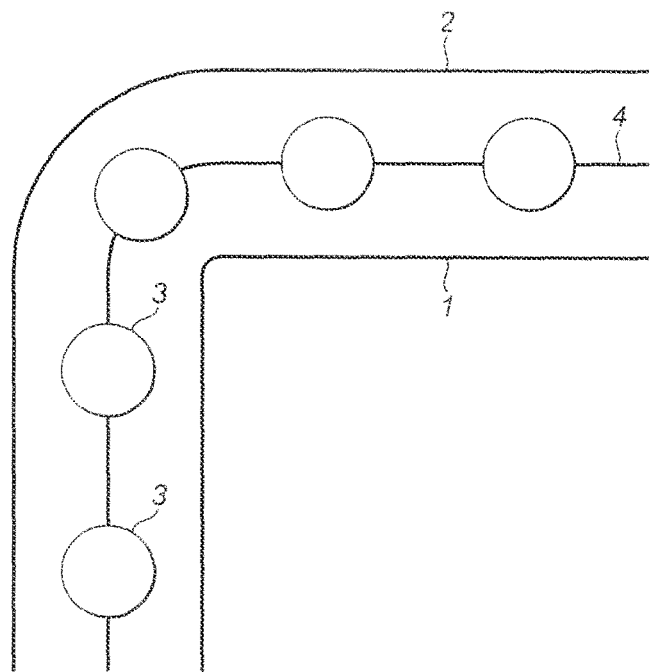

greater than the second thickness, and wherein either a said gasket reduces in thickness from the first thickness to the third thickness and then to the second thickness via one or more tapered sections which taper linearly to a reduced thickness in the direction towards the inner periphery, or b said gasket reduces in thickness from the first thickness to the third thickness via one or more steps which step to a reduced thickness in the direction towards the inner periphery and then from the third thickness to the second thickness via one or more steps which step to a reduced thickness in the direction towards the inner periphery, or c said gasket reduces in thickness from the first thickness to the third thickness and then to the second thickness via a combination of one or more steps and one or more tapered sections as defined above.

25 Claims, 2 Drawing Sheets

(51) Int. Cl.
  *C25B 9/00*  (2021.01)
  *H01M 8/0276*  (2016.01)
  *H01M 8/0284*  (2016.01)
  *C25B 1/46*  (2006.01)
  *C25B 9/20*  (2006.01)
  *C25B 15/00*  (2006.01)
  *F28D 9/00*  (2006.01)

(52) U.S. Cl.
  CPC .......... *C25B 15/00* (2013.01); *H01M 8/0276* (2013.01); *H01M 8/0284* (2013.01); *F28D 9/0062* (2013.01); *F28F 2230/00* (2013.01)

(58) Field of Classification Search
  USPC ........................................ 204/252
  See application file for complete search history.

(56) References Cited

U.S. PATENT DOCUMENTS

| | | | |
|---|---|---|---|
| 5,035,185 A * | 7/1991 | Schultz | B61D 7/22 |
| | | | 105/247 |
| 5,217,797 A | 6/1993 | Knox et al. | |
| 2010/0062320 A1 * | 3/2010 | Dammar | H01M 8/0276 |
| | | | 429/480 |
| 2011/0114496 A1 * | 5/2011 | Dopp | H01M 4/8631 |
| | | | 205/109 |
| 2011/0217627 A1 * | 9/2011 | Park | H01M 4/921 |
| | | | 429/530 |

FOREIGN PATENT DOCUMENTS

| | | |
|---|---|---|
| EP | 1 458 040 A3 | 9/2004 |
| JP | 11-201288 | 7/1999 |
| JP | 2015-178899 | 10/2015 |
| WO | WO 99/04446 A1 | 1/1999 |
| WO | WO 00/68463 A2 | 11/2000 |
| WO | WO 00/68463 A3 | 11/2000 |

OTHER PUBLICATIONS

Presentation by "INEOS Technologies Integrated Service", CLORO SUR—2012 (36 pgs.).

* cited by examiner

GASKET, APPARATUS INCORPORATING SAME AND METHOD

This application is the U.S. national phase of International Application No. PCT/EP2015/075108 filed Oct. 29, 2015 which designated the U.S. and claims priority to European Patent Application No. 14192503.2 filed Nov. 10, 2014, the entire contents of each of which are hereby incorporated by reference.

This invention relates to gaskets, apparatus incorporating said gaskets and to methods of using them. More especially, but not exclusively, the invention relates to gaskets for use in electrode structures, such as modular bipolar and filter press electrolysers for use in chloralkali processes and in fuel cells. The gaskets of the invention are useful in other applications, for example in heat exchangers, especially plate and frame heat exchangers.

U.S. Pat. No. 6,761,808 describes electrode assemblies. While these assemblies are effective, after some years use the gasket tends to become less effective and has to be replaced. In order to replace the gasket it is necessary to shut down the apparatus resulting in lost production. Furthermore replacing gaskets can result in earlier than necessary refurbishment of other components such as membranes or electrode coatings. The invention seeks to provide gaskets with an improved life time thereby allowing the apparatus to operate for longer before refurbishment. The invention seeks further to provide means for refurbishing existing apparatus to allow it to operate longer than previously anticipated.

According to the invention there is provided a gasket comprising a closed loop of resilient material, the loop having an inner periphery and an outer periphery, the gasket having a first thickness at a first position which is between 0% and 30% of the gasket width away from the outer periphery, a second thickness at a second position measured at a point at least 50% of the gasket width from the first position, and a third thickness at a third position intermediate the first and second positions and at least 10% of the gasket width from each, the first thickness being greater than the third thickness which is greater than the second thickness,
and wherein either
- a said gasket reduces in thickness from the first thickness to the third thickness and then to the second thickness via one or more tapered sections which taper linearly to a reduced thickness in the direction towards the inner periphery, or
- b said gasket reduces in thickness from the first thickness to the third thickness via one or more steps which step to a reduced thickness in the direction towards the inner periphery and then from the third thickness to the second thickness via one or more steps which step to a reduced thickness in the direction towards the inner periphery, or
- c said gasket reduces in thickness from the first thickness to the third thickness and then to the second thickness via a combination of one or more steps and one or more tapered sections as defined above.

The present invention relates to a gasket. The gasket comprises a closed loop of resilient material and has an inner periphery and an outer periphery. The closed loop can be in any shape suitable for the intended use. For use in electrolysers a generally rectangular configuration is typical. The gasket is made of a resilient material, such as a rubber for example EPDM, although the use of other resilient materials is not excluded. Where it is a rubber typically the resilient material will have a hardness (IRHD ISO 48) of about 35 to 95 for example 35, 45, 55, 65, 75, 85 or 95. A typical range of hardness is 60 to 90, such as 65 to 85, as measured according to IRHD ISO 48: (British version 2010) Method N for IRHD values 35-85 and method H for IRHD values 85-95. Sample size for both methods is 8-10 mm thick with other dimensions greater than or equal to 25 mm.

In electrode assemblies, rubber may however be attacked and degraded by liquor or evolved gas. Accordingly, the inner periphery may be provided with a liner of resistant material. Typically, the resistant material is a fluoropolymer, such as PTFE or FEP (fluorinated ethylene propylene). Many fluoropolymers are processed by extrusion. In order however to make them extrudable, other materials are admixed with the polymer to aid processing. Extruded fluoropolymer containing admixed materials is not wholly resistant to cell contents and will in time degrade. Even better results are obtained where skived fluoropolymer is used. Skiving is the process of cutting a thin layer from a block. By skiving it is possible to use fluoropolymer which has not been extruded and hence which does not require the presence of processing aids. Even greater durability is obtained when skived fluoropolymer is used.

The gasket of the present invention has a first thickness at a first position which is between 0% and 30% of the gasket width away from the outer periphery. In embodiments the first thickness is at the outer periphery of the gasket. In embodiments the gasket is provided with boltholes and the first thickness is intermediate the boltholes and the outer periphery of the gasket.

The second thickness is at a second position measured at a point at least 50% of the gasket width from the first position. Preferably the second position is at a point between 0% and 30% of the gasket width from the inner periphery.

The third thickness is at a third position intermediate the first and second positions and at least 10% of the gasket width from each. Preferably the third position is at a point between 40% and 60% of the gasket width away from the outer periphery.

The first thickness is typically 0.1 to 3.0 mm greater than the second thickness, such as 0.1 to 2.0 mm greater than the second thickness, and more preferably 0.5 to 1.0 mm greater than the second thickness.

The first thickness is typically in the range 1 to 10.0 mm preferably 2.0 to 7.0 mm.

The third thickness is preferably at least 0.2 mm greater than the second thickness and at least 0.2 mm thinner than the first thickness. For example, the third thickness may be 0.2 to 0.5 mm greater than the second thickness and 0.2 to 0.5 mm thinner than the first thickness. The third thickness may be equal to the average of the first and second thicknesses plus or minus 30% of the difference, and especially plus or minus 10% of the difference.

In the gasket according to the present invention the first thickness is greater than the third thickness which is greater than the second thickness. The reduction can be obtained by one or more tapers and/or one of more steps as defined in the claim and as is discussed further below.

Generally, when placed on a horizontal surface, the gasket may be defined by upper and lower surfaces between the upper and lower parts of the inner and outer peripheries. For convenience of description of the present invention the surfaces of the gasket, even when the gasket is not in a horizontal orientation, will be referred to as "upper" and "lower" surfaces based on their orientation when placed on a horizontal surface, and based on the location of tapers and/or steps, and ribs (when present, discussed further below) as follows:

1) If the gasket has tapers and/or steps on only one surface then this is the upper surface regardless of the presence and location of any ribs.
2) If the gasket has tapers and/or steps on both surfaces, but one or more ribs only on one surface then the surface with the one or more ribs should be considered as the upper surface, and
3) If the gasket has tapers and/or steps on both surfaces and one or more ribs on both surfaces then either surface can be considered as the upper surface according to the present invention.

For avoidance of doubt, we define "upper" and "lower" surfaces as above solely for the purpose of clarifying the spatial relationship of the gasket features. However this does not limit the orientation of the gaskets of the present invention when in use. In use the gaskets may, for example, be mounted horizontally but may equally be mounted off of the horizontal, such as vertically, and the tapers and/or steps, and any ribs, may be on either side or both sides of the gasket in any such orientation depending on the type of gasket used.

The lower surface may be essentially flat (horizontal) (when placed on a horizontal surface as noted above) and the reduction in thicknesses required obtained by tapers and/or steps on the upper surface. This is preferred. However, as is also apparent from above, it is also possible for there to be steps and/or tapers on both the upper and lower surfaces in the same gasket.

In one option the gasket reduces in thickness from the first thickness to the third thickness and then to the second thickness via one or more tapered sections which taper linearly to a reduced thickness in the direction towards the inner periphery. A "tapered section which tapers linearly" as used herein means a section in which the thickness of the gasket changes linearly from a thicker section to a thinner section. The taper in the tapered section may be defined by the rate of change in thickness or "grolient" of the taper, which as used herein should be measured perpendicular to the horizontal plane which runs through the gasket from the inner periphery to the outer periphery when the gasket is placed on a horizontal surface.

There may be a single taper from the first to the second thickness (via the third thickness), or there may be two or more tapered sections with different tapers, such as a first taper from the first thickness to the third thickness and a second taper from the third thickness to the second thickness.

Preferably the one or more tapered sections occur over at least 50% of the distance between the first and second positions, more preferably over at least 75% of the distance.

Most preferably the taper is a continuous taper from a relatively thick cross-section towards the outer periphery to a relatively thin section towards the inner periphery, and in particular covering over 75% of the distance from the outer periphery to the inner periphery.

The gradient of the average taper between the first and second positions is generally 1:10 to 1:200 relative to the horizontal plane running through the gasket from the inner periphery to the outer periphery, preferably 1:20 to 1:200, such as 1:50 to 1:150.

Figure 3:
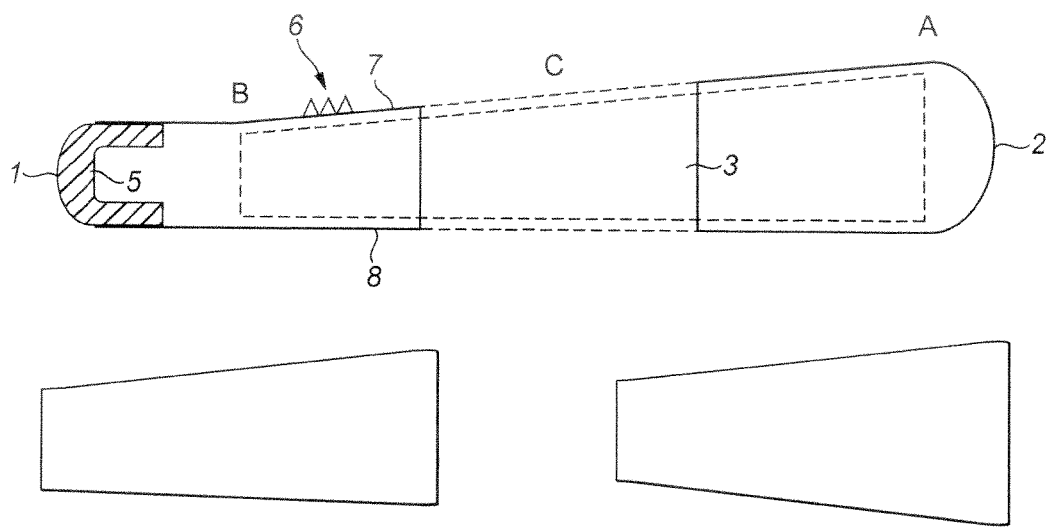

Yet more preferably the cross-section formed by the upper and lower surfaces of the gasket between the first and second positions is in the shape of an isosceles, right-angle or scalene trapezium. Examples of this are shown in FIG. 3 and described further below.

Most preferably, the lower surface may be essentially flat (horizontal) (when placed on a horizontal surface as noted above) and the reduction in thicknesses obtained by a taper on the surface which is the upper surface. The cross-section formed by the upper and lower surfaces of the gasket between the first and second positions is then in the shape of a right-angle trapezium.

In an alternative the gasket reduces in thickness from the first thickness to the third thickness via one or more steps which step to a reduced thickness in the direction towards the inner periphery and then from the third thickness to the second thickness via one or more steps which step to a reduced thickness in the direction towards the inner periphery. As used herein a "step" refers to a section which exhibits a change in thickness at least twice the gradient either side of the step. Preferably the thickness of the gasket is constant (no gradient) or changes by a gradient less than 1:50 before and after the step, but changes by a gradient of at least 1:2 during the step.

Alternatively, the gasket may reduce in thickness from the first thickness to the third thickness and then to the second thickness via a combination of one or more stepped sections and one or more tapered sections as defined above. For example, the gasket may reduce from the first thickness to the third thickness via one or more tapered sections and from the third thickness to the second thickness via one or more steps.

As noted above, the gasket of the present invention may have at least one rib. The gasket of the present invention preferably has at least one rib upstanding from the upper surface of the gasket and lying intermediate the third position and the inner periphery. The at least one rib generally extends parallel to the inner periphery of the gasket. Embodiments can have at least one rib upstanding from the upper surface of the gasket and lying intermediate the second position and the inner periphery. In embodiments at least one rib may be provided on each of the upper and lower surfaces of the gasket.

In preferred embodiments at least one rib lies on the upper surface intermediate the second position and a liner on the inner periphery. The rib or ribs run generally parallel to the inner periphery of the gasket. Typically 1 to 20 more preferably 1 to 10 still more preferably 2 to 6 ribs are provided. The ribs typically upstand from the gasket by 0.2 to 2.0 mm.

In one embodiment there are provided 2 to 5 ribs on the upper surface of the gasket standing 0.5 to 1.0 mm above the upper surface of the gasket. In these embodiments the first thickness is preferably 3.0 to 5.0 mm and is preferably 0.5 to 1 mm greater than the second thickness.

In another embodiment of the invention there are provided 3 to 6 ribs on the tipper surface of the gasket standing 0.3 to 0.7 mm above the upper surface of the gasket. The first thickness is 4.0 to 7.0 mm and is preferably 0.1 mm to 2.0 mm greater than the second thickness.

In use the rib or ribs abut an adjacent component and define a tortuous path which reduces the possibility of leakage of liquor through the seal. They also provide a localised increase in the sealing pressure applied.

According to the invention there is further provided an electrode assembly comprising a diaphragm or membrane intermediate an anode and a cathode and gaskets intermediate the diaphragm or membrane and the anode and cathode wherein at least one gasket is a gasket of the invention.

According to the invention there is further provided a method of refurbishing an electrode the electrode assembly comprising a diaphragm or membrane intermediate an anode and a cathode and gaskets intermediate the diaphragm and the anode and cathodes the method comprising i) disassembling the electrode assembly,
ii) replacing a gasket with a gasket of the invention and
iii) reassembling the electrode assembly.

In a further aspect of the present invention there is provided a process for electrolysing alkali chloride in a modular bipolar or filter press electrolyser, which electrolyser comprises one or more electrode assemblies comprising a gasket of the invention.

According to the invention there is yet further provided the use of a gasket of the invention in an electrode assembly, and in particular in reducing the down-time of an electrode assembly.

Figure 2:
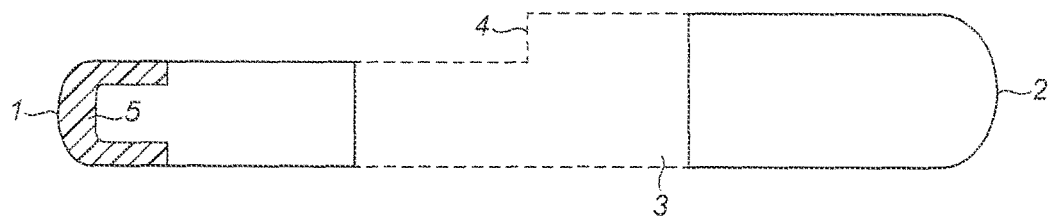
Figure 4:
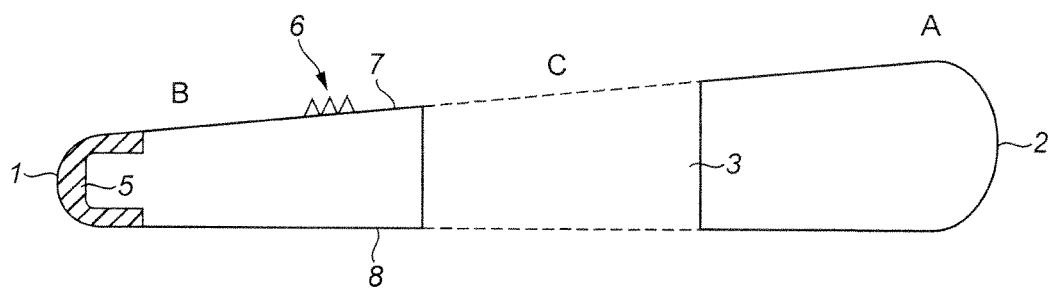
Figure 5:
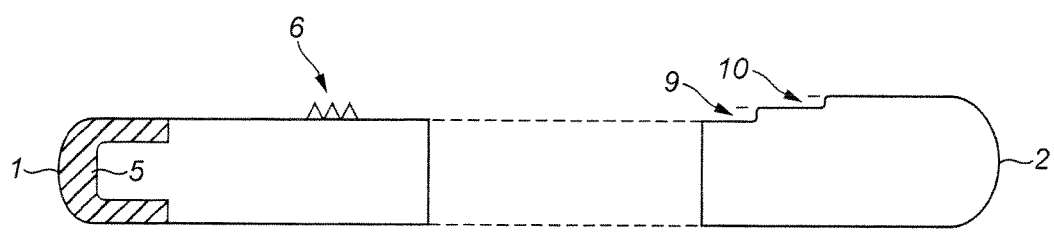

Embodiments of the invention will be described by way of non-limiting example by reference to the accompanying figures of which FIG. 1 is a scrap elevation of the corner of a gasket according to the prior art, FIG. 2 is a cross section of the gasket of FIG. 1, FIG. 3 is a cross section of a first embodiment of the invention, FIG. 4 is a cross section of a second embodiment of the invention, and FIG. 5 is a cross section of a third embodiment of the invention.

Whilst as previously noted the invention has application in a range of fields, for convenience it will be discussed by reference to a chloralkali electrode.

With reference to FIGS. 1 and 2, the prior art gasket comprises a closed loop of generally rectangular configuration, having an inner periphery, 1, an outer periphery, 2, a series of bolt-holes, 3, and a single step, 4. The gasket has a liner 5 at the inner periphery of the gasket.

The holes 3 are provided to register with holes in a flange of an electrode component to allow the apparatus to be bolted together. In other embodiments, for example filter-press electrolysers, it may not be necessary to provide holes since the components are urged together by longitudinal forces applied by means other than flange bolts. Examples would include electrolyser end plates compressed together by jacks or presses or tie rods The gasket shown in FIGS. 1 and 2 has a stepped structure with the outer portion of the gasket being thicker than an inner portion. The step passes through the holes in the gasket. A problem with this configuration is that liquor which enters one part of the gasket can be channelled elsewhere.

The invention provides a gasket which has a first thickness at a first position which is between 0% and 30% of the gasket width away from the outer periphery, a second thickness at a second position measured at a point at least 50% of the gasket width from the first position, and a third thickness at a third position intermediate the first and second positions and at least 10% of the gasket width from each, the first thickness being greater than the third thickness which is greater than the second thickness.

One way in which this can be achieved is by providing a taper in which the gasket tapers from a relatively thick cross-section towards the outer periphery to a relatively thin cross-section towards the inner periphery. Such a configuration is shown in FIG. 3, where labels 1-5 correspond to the same components as FIGS. 1 and 2. As can be seen from FIG. 3 the taper can extend from the outer periphery 2 past the bolt holes 3 (when present) and close to the edge of the liner 5 at the inner periphery of the gasket. The upper surface is provided with a series of upstanding ribs, 6, which run generally parallel to the inner periphery 1 of the gasket and of which three are shown in FIG. 3.

Also marked on FIG. 3 are the upper surface 7, lower surface 8, the first position (A), the second position (B) and the third position (C).

The cross-section formed by the upper and lower surfaces of the gasket between the first and second positions defines a right-angled trapezium, as shown by the dashed shape.

Also shown in FIG. 3 are isosceles and scalene trapeziums. Such cross-sections may be obtained when the lower surface also tapers relative to the horizontal.

FIG. 4 is a further preferred embodiment. In this case the taper extends the complete width of the gasket including the liner section.

Another configuration of the gasket of the present invention is shown in FIG. 5. In this case the reduction in thickness is achieved is by providing a plurality of steps 9, 10 as one moves towards the outer periphery of the gasket. In this embodiment it is preferred that bolt holes do not go through a step.

While we do not wish to be bound by theory it is thought that the presence of a relatively thicker portion near the outer periphery of the gasket counterbalances flange rotation which would otherwise reduce the compression sealing capability at the inner periphery of the gasket.

Flange rotation may be caused by differential forces on the flange.

One cause of differential force may be due to the flange being more dimensionally stable at its inner periphery where it joins and is supported by the pan wall which serves as a reinforcing strut.

Another cause may occur when the inner periphery of the gasket is protected by a layer of chemically resistant material, such as a fluoropolymer, which is relatively less compressible than the rest of the gasket material.

A third cause of differential force on the flange may be failure to apply the force used to compress the flange and gasket assembly together along the centre line of the flange, resulting in the compressive force being preferentially applied to a narrower margin of material at the outer periphery of the gasket. This may occur in bolted flanges when the centre line of the boltholes cannot be designed to align with the centre line of the flange, for example due to access problems for bolt tightening. In non-bolted flanges this may be caused when clamps on the flange, or bars or other media used to transmit the compressive load between flanges and from end jacks, cannot be aligned with the centre line of the flange due to access issues.

The gasket of the present invention offsets the negative effects of flange rotation from all three causes above and increases the sealing pressure on the inner periphery of the gasket. This improved sealing leads to a beneficial service life by eliminating tracking of liquors through the gasket, which would otherwise lead to leaks or other potentially destructive effects such as accelerated gasket damage behind protective layers or crevice corrosion of the flanges due to trapped liquor between the gasket an the flange.

Accordingly the arrangement assists in producing a liquor resistant seal at the inner periphery of the gasket for all gasket/flange assemblies whether they are compressed by bolts or non-bolted and compressed by clamps or jacks.

Improved sealing and lifetime benefits are obtained from the gasket profile of this invention whether the profile is achieved using one or more tapers, a series of steps, or a combination of tapers and steps. Even greater benefits are achieved when gaskets with the profile of this invention are
i) provided with a chemically resistant protective layer such as a fluoropolymer at the inner periphery, ii) provided with one or more ribs as described herein, and/or.

iii) in the case where the profile of this invention incorporates steps and boltholes, by ensuring that the steps do not intersect the boltholes, thus avoiding a potential route for liquor tracking to boltholes.

Each of the above can provide additional benefit as has been described. Particularly preferred is the provision of a chemically resistant protective layer such as a fluoropolymer at the inner periphery. The provision of a chemically resistant protective layer such as a fluoropolymer with one or both of the other options (when steps and boltholes are present for the third option) provides the greatest benefit.

Prior art gaskets typically have a service life of between 3.5 and 4 years. Gaskets of the invention have been tested for 48 months without failure and are still on load. Typical life is therefore considered to be significantly greater than 4 years.

TEST EXAMPLES

Gaskets According to the Invention

Gaskets were provided which have a cross-section of the type schematically represented by FIG. 4. The gaskets were in the form of a rectangular 'picture frame' suitable for mounting in a BICHLOR™ chloralkali electrolyser and were manufactured from EPDM rubber with a skived PTFE tape protection on the inner periphery. The gaskets contained 21 mm diameter bolt holes at 10 cm spacings round the gasket and with the bolt hole centres located 40% of the gasket width away from the outer periphery and 60% of the gasket width away from the inner periphery. To help with the transferring of bolting pressure to the inner periphery to aid sealing the gasket was manufactured with a cross section of a scalene trapezium, with bottom surface of the gasket running at right angles to the inner and outer periphery and with the top surface of the gasket being tapered from the outer periphery to the inner periphery, with the thickness at the outer periphery being thicker than the thickness at the inner periphery and the gradient of the slope of the top surface relative to the bottom surface being 1 in 67. Furthermore the gaskets were provided with 4 ribs in the top surface running parallel to the inner periphery. The ribs had a height equivalent to 19% of the thickness of the gasket at the inner periphery and were spaced 1.9 mm apart with the innermost rib being located 24% of the width of the gasket away from the inner periphery and the outermost rib being located 36% of the width of the gasket away from the inner periphery. These gaskets are named 'Type A' in the subsequent examples.

Comparative Gaskets

Gaskets were provided which have a cross-section of the type schematically represented by FIG. 2. Samples of this second type of gasket, 'Type B', also in the form of a rectangular 'picture frame' suitable for mounting in a BICHLORT™ chloralkali electrolyser, were manufactured from a chemically and mechanically identical EPDM rubber to the 'Type A' gaskets and with an identical skived PTFE tape protection on the inner periphery. The distance between the inner and outer periphery, the thickness of the inner periphery, the thickness of the outer periphery and the size, spacing and location of the bolt holes were identical in the 'Type B' and 'Type A' gaskets. However the 'Type B' gaskets did not have ribs running parallel to the inner periphery and were not provided with a taper. Instead the top surface of the 'Type B' gasket was parallel to the bottom surface and both surfaces lay in a plane running perpendicular to the inner and outer periphery. In this case to help with the transferring of bolting pressure to the inner periphery to aid sealing the difference in height between the outer periphery and the inner periphery was achieved by providing a single step in the top surface of the gasket running parallel to the inner and outer peripheries at a distance 40% of the gasket width away from the outer periphery and 60% of the gasket width away from the inner periphery of the gasket.

Example 1

14 pairs of gaskets of 'Type A' were built into modules in a BICHLOR™ electrolyser using an Aciplex 6801 membrane supplied by the Asahi Kasei company. The electrolyser was started up and operated according to approved procedures at an internal gas pressure of 250 mbar gauge on the hydrogen side and 235 mbar gauge on the chlorine side. The modules were periodically monitored for visible evidence of minor leakage such as minor crusts round bolts and stalactites hanging from the bottom of the modules. After 48 months on load the modules showed no leaks and continued to operate well.

Example 2

69 pairs of gaskets of 'Type A' were built into 69 modules in a BICHLOR™ chloralkali electrolyser using an Aciplex 6801 membrane supplied by the Asahi Kasei Corporation. The electrolyser was started up and operated according to approved procedures at an internal gas pressure of 250 mbar gauge on the hydrogen side and 235 mbar gauge on the chlorine side. The modules were periodically monitored for visible evidence of minor leakage such as minor crusts round bolts and stalactites hanging from the bottom of the modules. After 28 months of operation the modules exhibit no visible signs of leakage and continued to run well.

Example 3 (Comparative)

A further 69 pairs of gaskets of 'Type B' were built into 69 modules in a BICHLOR™ chloralkali electrolyser using an Aciplex 6801 membrane supplied by the Asahi Kasei Corporation. Build methods were identical to those used for the 'Type A' modules in the examples above. The electrolyser was started up and operated according to approved procedures at an internal gas pressure of 250 mbar gauge on the hydrogen side and 235 mbar gauge on the chlorine side. The modules were periodically monitored for visible evidence of minor leakage such as minor crusts round bolts and stalactites hanging from the bottom of the modules. After 10 months of operation there were no visible signs of leaking. After 25 months on load three modules exhibited minor bolt crusting and stalactites indicative of low level leaking, after 37 months on load 6 modules showed low level leak symptoms and after 49 months on load 7 modules showed low level leak symptoms.

Example 4 (Comparative)

69 pairs of gaskets of 'Type B' were built into 69 modules in a BICHLOR™ chloralkali electrolyser using a Nafion 2030 membrane supplied by E.I. DuPont de Nemours and Company. Build methods were identical to those used for the 'Type A' modules in the examples above. The electrolyser was started up and operated according to approved procedures at an internal gas pressure of 250 mbar gauge on the hydrogen side and 235 mbar gauge on the chlorine side. The modules were periodically monitored for visible evidence of minor leakage such as minor crusts round bolts and stalactites hanging from the bottom of the modules. After 9 months of operation the modules exhibited no visible signs of leaking. After 24 months on load two modules exhibited minor bolt crusting and stalactites indicative of low level leaking, after 36 months on load 3 modules showed low level leak symptoms and after 48 months on load 7 modules showed low level leak symptoms.

The gaskets of the invention are useful in newly constructed assemblies but may also be used to replace gaskets in existing assemblies thereby improving performance.

The invention claimed is:

1. A gasket comprising a closed loop of resilient material, the loop having an inner periphery and an outer periphery, the gasket having a first thickness at a first position which is between 0% and 30% of the gasket width away from the outer periphery, a second thickness at a second position measured at a point at least 50% of the gasket width from the first position, and a third thickness at a third position intermediate the first and second positions and at least 10% of the gasket width from each, the first thickness being greater than the third thickness which is greater than the second thickness, and wherein either
  a said gasket reduces in thickness from the first thickness to the third thickness and then to the second thickness via one or more tapered sections which taper linearly to a reduced thickness in the direction towards the inner periphery, or
  b said gasket reduces in thickness from the first thickness to the third thickness via one or more steps which step to a reduced thickness in the direction towards the inner periphery and then from the third thickness to the second thickness via one or more steps which step to a reduced thickness in the direction towards the inner periphery, or
  c said gasket reduces in thickness from the first thickness to the third thickness and then to the second thickness via a combination of one or more steps and one or more tapered sections as defined above,
  and further wherein
  i) the gasket includes one or more steps and is provided with boltholes, wherein the boltholes do not intersect the steps,
  and/or
  ii) the gasket is provided with a chemically resistant layer of fluoropolymer at the inner periphery.

2. A gasket as claimed in claim 1 wherein the second position is at a point between 0% and 30% of the gasket width from the inner periphery.

3. A gasket as claimed in claim 1 wherein the third position intermediate the first and second positions is at a point between 40% and 60% of the gasket width away from the outer periphery.

4. A gasket as claimed in any claim 1 wherein said one or more tapered sections occur over at least 50% of the distance between the first and second positions.

5. A gasket as claimed in claim 1 wherein said gasket reduces in thickness from the first thickness to the third thickness and then to the second thickness via one or more tapered sections which taper linearly to a reduced thickness in the direction towards the inner periphery.

6. A gasket as claimed in claim 5 wherein the cross-section formed by the upper and lower surfaces of the gasket between the first and second positions is in the shape of an isosceles, right-angle or scalene trapezium.

7. A gasket as claimed in claim 5 wherein the gradient of the overall taper between the first and second positions is 1:20 to 1:200 relative to the horizontal plane running through the gasket from the inner periphery to the outer periphery.

8. A gasket as claimed in claim 1 wherein the gasket is provided with boltholes and the first thickness is intermediate the boltholes and the outer periphery of the gasket.

9. A gasket as claimed in claim 1 wherein the first thickness is at the outer periphery of the gasket.

10. A gasket as claimed in claim 1 wherein at least one rib is provided on the gasket.

11. A gasket as claimed in claim 10 having at least one rib upstanding from the upper surface of the gasket and extending parallel to the inner periphery of the gasket and lying intermediate the third position and the inner periphery, and preferably lying intermediate the second position and the periphery.

12. A gasket as claimed in claim 10 wherein at least one rib is provided on each face of the gasket.

13. A gasket as claimed in claim 1 wherein the gasket is provided with a chemically resistant protective layer of fluoropolymer at the inner periphery.

14. A gasket as claimed in claim 1 for use in an electrode assembly.

15. An electrode assembly comprising a diaphragm or membrane intermediate, an anode and a cathode and a gasket intermediate the diaphragm or membrane and the anode and cathode wherein at least one gasket in the assembly is a gasket according to claim 1.

16. A method of refurbishing an electrode in an electrode assembly comprising a diaphragm or membrane intermediate an anode and a cathode and a gasket intermediate the diaphragm and the anode and cathode the method comprising
  i) disassembling the electrode assembly,
  ii) replacing a gasket with a gasket according to claim 1, and
  iii) reassembling the electrode assembly.

17. Process for electrolysing alkali chloride in a modular bipolar or filter press electrolyser, which electrolyser comprises one or more electrode assemblies comprising a gasket according to claim 1.

18. A method of assembling an electrode assembly, the method comprising placing a diaphragm or membrane between an anode and a cathode and placing a gasket according to claim 1 between the diaphragm and the anode and cathode in the electrode assembly.

19. An electrode assembly according to claim 15 wherein at least one gasket in the assembly is a gasket as defined above.

20. A method of refurbishing an electrode in an electrode assembly according to claim 16 wherein a gasket is replaced with a gasket as defined above.

21. Process according to claim 17 wherein the electrolyser comprises one or more electrode assemblies comprising a gasket as defined above.

22. Method according to claim 18 wherein the gasket is as defined above.

23. A gasket as claimed in claim 5 wherein the taper is a continuous taper from a relatively thick cross section towards the outer periphery to a relatively thin section towards the inner periphery.

24. A gasket as claimed in claim 13 wherein the fluoropolymer is PTFE and/or wherein the fluoropolymer is skived.

25. A gasket as claimed in claim 1 wherein the resilient material has a hardness (IRHD ISO 48) of about 35 to 95.

\* \* \* \* \*